United States Patent
Phung et al.

(10) Patent No.: US 8,882,191 B2
(45) Date of Patent: Nov. 11, 2014

(54) COLLAPSIBLE CANOPY FOR A CHILD CONVEYANCE DEVICE

(71) Applicant: Monahan Products, LLC, Hingham, MA (US)

(72) Inventors: Trung Q. Phung, Milton, MA (US); Eric Perlman, Weymouth, MA (US); Kathleen Maclary, Allston, MA (US); David Andrew Lehman, Lancaster, PA (US); Robert Scott Anderson, East Earl, PA (US)

(73) Assignee: Monahan Products, LLC, Hingham, MA (US)

( * ) Notice: Subject to any disclaimer, the term of this patent is extended or adjusted under 35 U.S.C. 154(b) by 104 days.

(21) Appl. No.: 13/622,756

(22) Filed: Sep. 19, 2012

(65) Prior Publication Data

US 2014/0077535 A1    Mar. 20, 2014

(51) Int. Cl.
*A47C 7/66* (2006.01)
*A47D 15/00* (2006.01)
*B62B 9/14* (2006.01)

(52) U.S. Cl.
CPC .. *A47D 15/00* (2013.01); *B62B 9/14* (2013.01)
USPC ................................. 297/184.13; 297/184.17

(58) Field of Classification Search
CPC ............ A47C 7/62; A47C 7/66; A47D 13/00; A47D 13/02; A47D 15/00; B62B 9/145
USPC ........................................ 297/184.13, 184.17
See application file for complete search history.

(56) References Cited

U.S. PATENT DOCUMENTS

| 4,978,166 | A | * | 12/1990 | James ..................... 297/184.17 |
| 6,170,910 | B1 | * | 1/2001 | Bapst ..................... 297/184.13 |
| 7,891,732 | B2 | * | 2/2011 | Hei et al. ................. 297/184.13 |
| 7,963,596 | B2 | * | 6/2011 | Efthimiou ............ 297/184.17 X |
| 8,186,368 | B2 | * | 5/2012 | Troutman et al. ..... 297/184.13 X |
| 8,534,751 | B2 | * | 9/2013 | Hei et al. ................. 297/184.13 |
| 2007/0257526 | A1 | * | 11/2007 | Hei et al. ................. 297/184.13 |
| 2011/0101742 | A1 | * | 5/2011 | Hei et al. ................. 297/184.13 |

* cited by examiner

*Primary Examiner* — Rodney B White
(74) *Attorney, Agent, or Firm* — Lando & Anastasi, LLP (57) ABSTRACT

Child conveyance devices and canopies for them are described. In one embodiment a child conveyance device comprises a shell including a first canopy recess, a support surface configured to support a child, and a retractable canopy mounted on a canopy cap pivotally coupled to the shell and configured to support the canopy above at least a portion of the support surface and to secure a first portion of the canopy in a retracted configuration within the first canopy recess upon positioning of the canopy cap in a closed configuration.

20 Claims, 8 Drawing Sheets

COLLAPSIBLE CANOPY FOR A CHILD CONVEYANCE DEVICE

BACKGROUND OF INVENTION

Aspects and embodiments of the present disclosure are directed generally to child conveyance devices, for example, strollers and/or car seats, and to canopies for use with such child conveyance devices.

SUMMARY OF INVENTION

In accordance with a first aspect, there is provided a child conveyance device. The child conveyance device comprises a shell including a first canopy recess, and a retractable canopy mounted on a canopy support mechanism, the canopy support mechanism pivotally coupled to the shell and configured to support a portion of the canopy and to secure a portion of a rear section of the canopy in a retracted configuration within the first canopy recess.

In accordance with some embodiments, the canopy support mechanism is coupled to the shell by a cam, the cam configured to releasably retain the canopy cap in each of a position in which the canopy is in a fully extended position and in which the canopy in a retracted configuration at least partially within the first recess.

In accordance with some embodiments, the cam is further configured to releasably retain the canopy support mechanism in a position in which the canopy is in a partially extended position.

In accordance with some embodiments, the child conveyance device further comprises a lock mechanism and lock release actuator configured to releasably lock the canopy in one of the position in which the canopy is in the fully extended position, in which the canopy is in the partially extended position, and in which the canopy is in the retracted configuration at least partially within the first recess.

In accordance with some embodiments, the child conveyance device comprises a stroller.

In accordance with some embodiments, the child conveyance device comprises a car seat.

In accordance with some embodiments, the canopy support mechanism comprises a canopy cap including a second recess configured to retain a portion of a forward section of the canopy when the canopy cap is positioned in a closed configuration.

In accordance with some embodiments, the canopy is releasably affixed to one of the shell and the canopy cap by a section of plastic tubing disposed in a tubular section of fabric formed in the canopy, the tubular section of fabric including the section of plastic piping releasably retained in a recess defined between a hold-down and a wall of one of the shell and the canopy cap, the hold-down formed of a resilient material and including an end portion configured to be displaced from a position adjacent the wall of the one of the shell and the canopy cap to a sufficient degree to allow the tubular section of fabric including the section of plastic piping to be introduced or removed from the cavity.

In accordance with some embodiments, the canopy support mechanism further comprises a semi-rigid stanchion configured to support a portion of the canopy.

In accordance with some embodiments, the stanchion is pivotally secured to the shell.

In accordance with some embodiments, the stanchion is mechanically coupled to the canopy.

In accordance with some embodiments, the stanchion is mechanically coupled to the canopy cap.

In accordance with some embodiments, the stanchion is configured to secure the portion of the rear section of the canopy within the first recess when the canopy cap is positioned in the closed configuration.

In accordance with some embodiments, the stanchion is configured to secure the portion of the forward section of the canopy within the second recess when the canopy cap is positioned in the closed configuration.

In accordance with some embodiments, the canopy is entirely enclosed within the first recess and the second recess when the canopy is positioned in the closed configuration.

In accordance with another aspect, there is provided a method of operating canopy of a child conveyance device. The method comprises moving a canopy cap away from a closed position against a shell of the child conveyance device, the movement of the canopy cap drawing a portion of the canopy from one of a recess in the shell of the child conveyance device and a recess in the canopy cap.

In accordance with some embodiments, the method further comprises actuating a lock release mechanism, releasing a lock holding the canopy cap in a closed position against the shell of the child conveyance device.

In accordance with some embodiments, the movement of the canopy cap draws a stanchion from a position at least partially within one of the recess in the shell of the child conveyance device and the recess in the canopy cap.

In accordance with some embodiments, the method further comprises displacing the canopy cap from an open position to the closed position against a shell of the child conveyance device, the displacement of the canopy cap situating a portion of the canopy within one of the recess in the shell of the child conveyance device and the recess in the canopy cap.

In accordance with some embodiments, a force applied from the stanchion to the canopy facilitates situating the portion of the canopy within one of the recess in the shell of the child conveyance device and the recess in the canopy cap.

In accordance with some embodiments, the method further comprises situating a portion of a rear section of the canopy within the recess in the shell of the child conveyance device and situating a portion of a forward section of the canopy within the recess in the canopy cap.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Parents or caregivers of young children or babies may be challenged with transporting a child while keeping the child warm and protected from the elements. When a child is placed in a child conveyance device, such as a car seat or a stroller, a caregiver may desire to cover the child with a canopy. The canopy may provide protection from the sun, wind, or rain for a child in the child conveyance device.

As used herein the term "child conveyance device" includes any apparatus, mobile or stationary, in which a child may be placed wherein it may be desirable to supply a canopy for the child. For example, a child conveyance device may be any of a stroller, a car seat, a seat, or a child swing. The child conveyance device may be a multi-purpose carrier which may be releasably secured in both a stroller frame and in a base of a car seat. The child conveyance device may include a seat for a child.

Figure 1:
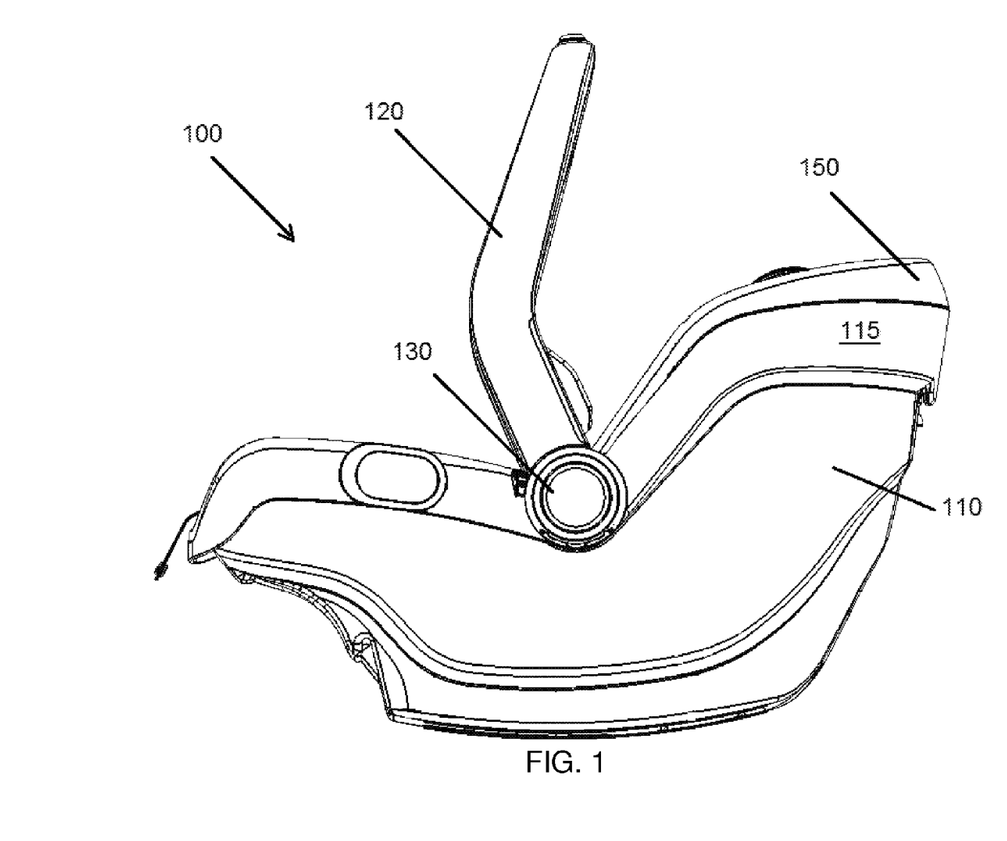
FIG. 1 is a plan view from the side of a child conveyance device in accordance with an embodiment of the present invention.

In an embodiment of the present invention, indicated generally at 100 in FIG. 1, there is provided a child conveyance device. The child conveyance device 100 may be a stand-alone device or may be configured to be secured to, for example, a stroller frame or to a base of a car seat by the provision of appropriate securing mechanisms as are known in the art on, for example, a lower surface of the device. The child conveyance device 100 includes a shell 110 and a carrying handle 120 pivotally attached to the shell 110 at handle pivot mechanisms 130 which may be positioned on an outer surface of either or both sides of the shell 110. The handle 120 is generally U-shaped, and may be pivoted into a position extending generally vertically upward from the pivot mechanism(s), into a position against a surface of the shell 110, or into one or more intermediate positions. The shape, form, and method of connection of the handle 120 to the shell is not, however, limited to that illustrated. Other handles having different shapes, orientations, or methods of connection to the shell of a child conveyance device 100 may be utilized in various embodiments.

A canopy support mechanism including, for example, a canopy cap 150, is illustrated in FIG. 1 in a closed position. In various embodiments the canopy cap 150 may secure a canopy 180 (illustrated in FIGS. 4 and 6) for the child conveyance device within a first recess 115 in the rear upper portion of the shell 110 and/or within a second recess 190 (illustrated in FIGS. 2 and 7) within the canopy cap 150. When the canopy cap 150 is in the closed position, a portion or the entirety of a rear section 180A of the canopy 180 may be secured within the first recess 115 and a portion or the entirety of a forward section 180B of the canopy 180 may be secured within the second recess 190.

Figure 2:
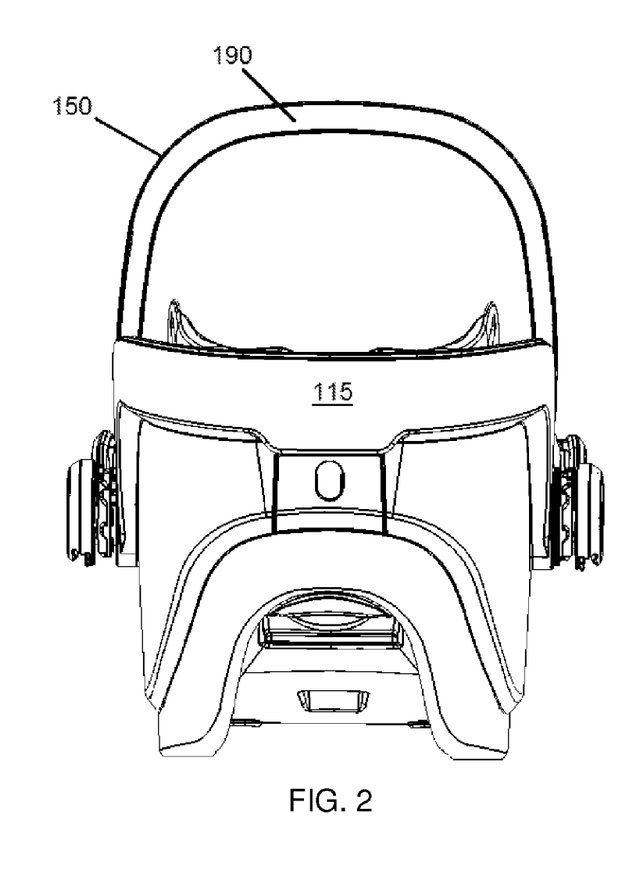
FIG. 2 is a plan view from the rear of a child conveyance device in accordance with an embodiment of the present invention.
Figure 7:
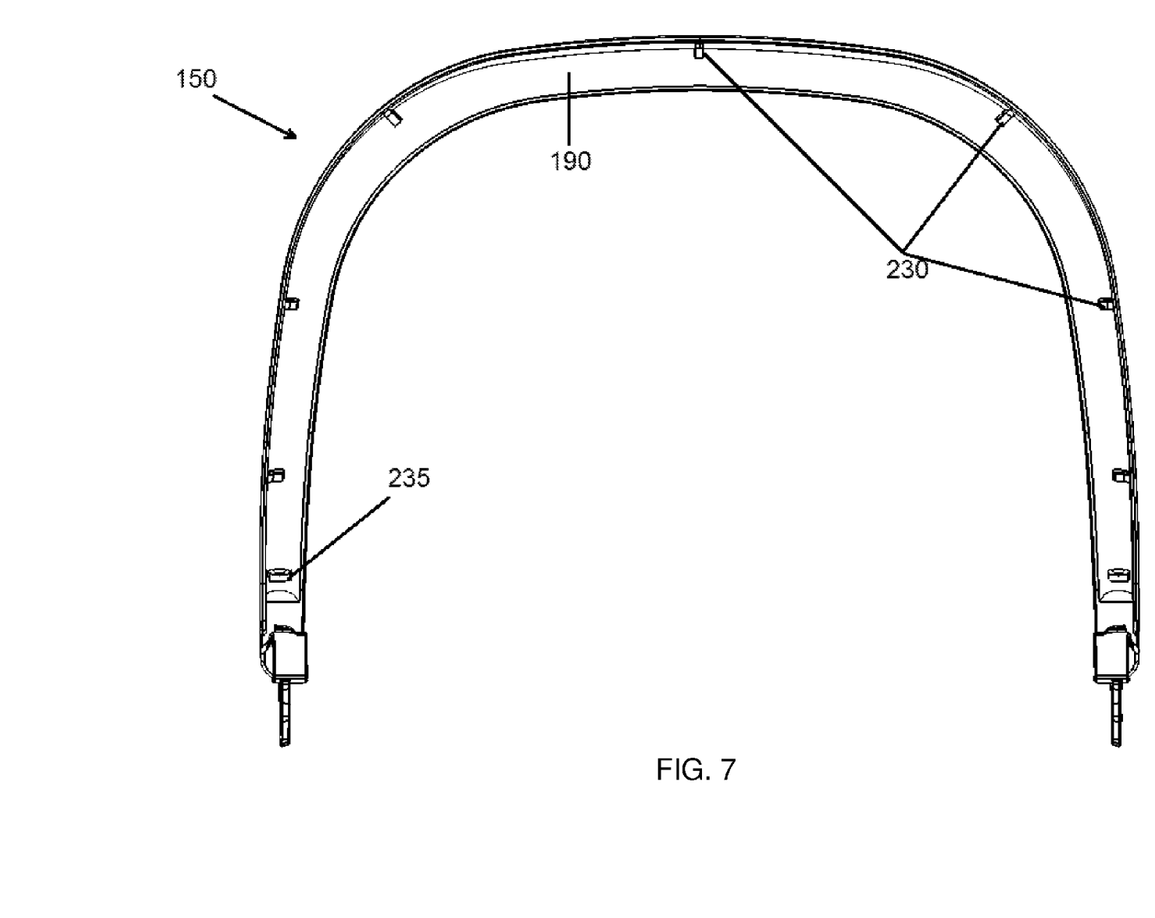
FIG. 7 is a plan view of a canopy cap in accordance with an embodiment of the present invention.

The second recess 190 in the canopy cap 150 is illustrated in FIG. 2 which is a rear view of an embodiment of the child conveyance device 100 with the canopy cap 150 oriented in an open extended position. Additional features such as the carrying handle 120 and a stanchion 170, described below, have been omitted from FIG. 2 for clarity. In the retracted or closed position, the canopy 180 may be entirely enclosed within the first recess 115 and/or the second recess 190 and may be hidden and/or protected from the environment by the shell 110 and/or canopy cap 150.

Figure 3:
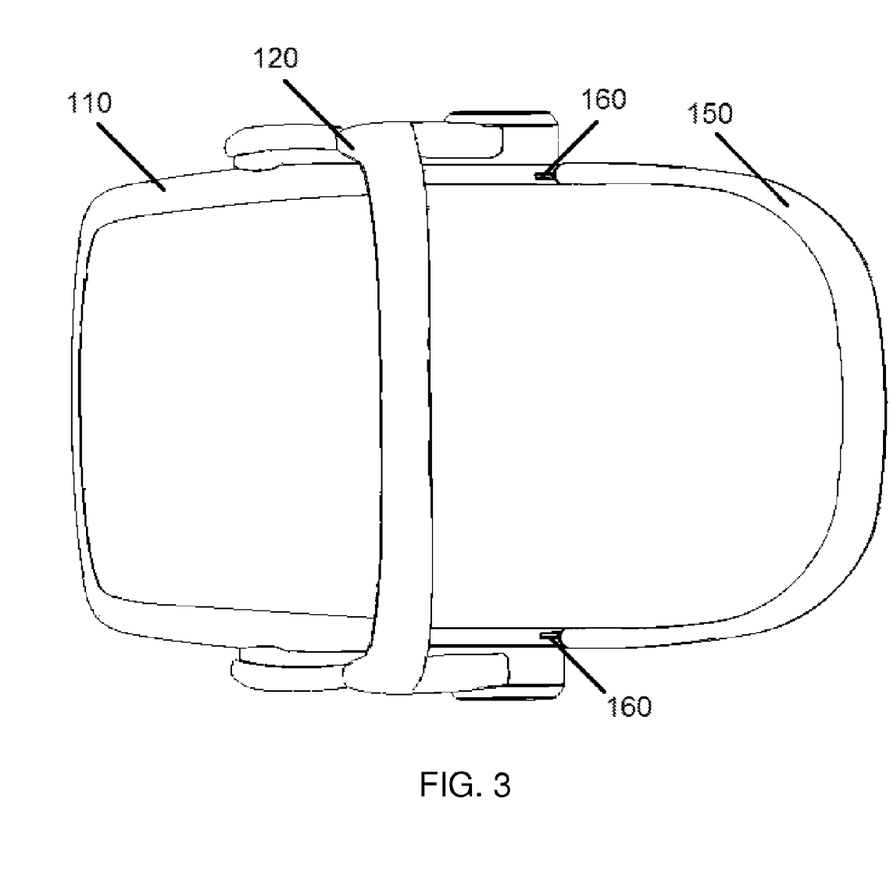
FIG. 3 is a plan view from the top of a child conveyance device in accordance with an embodiment of the present invention.

In a top-down view in FIG. 3, where internal components of the child conveyance device 100 have been omitted for clarity, it can be seen that the canopy cap 150 extends over a substantial portion of the upper surface of the rear of the shell 110. The canopy cap 150 is secured to the shell 110 at two canopy cap pivot points 160. In various embodiments, the canopy cap 150 may be shaped differently and/or secured to the shell by a mechanism different from that illustrated. For example, the canopy cap 150 may be secured to the shell 110 at only a single pivot point 160.

Figure 4:
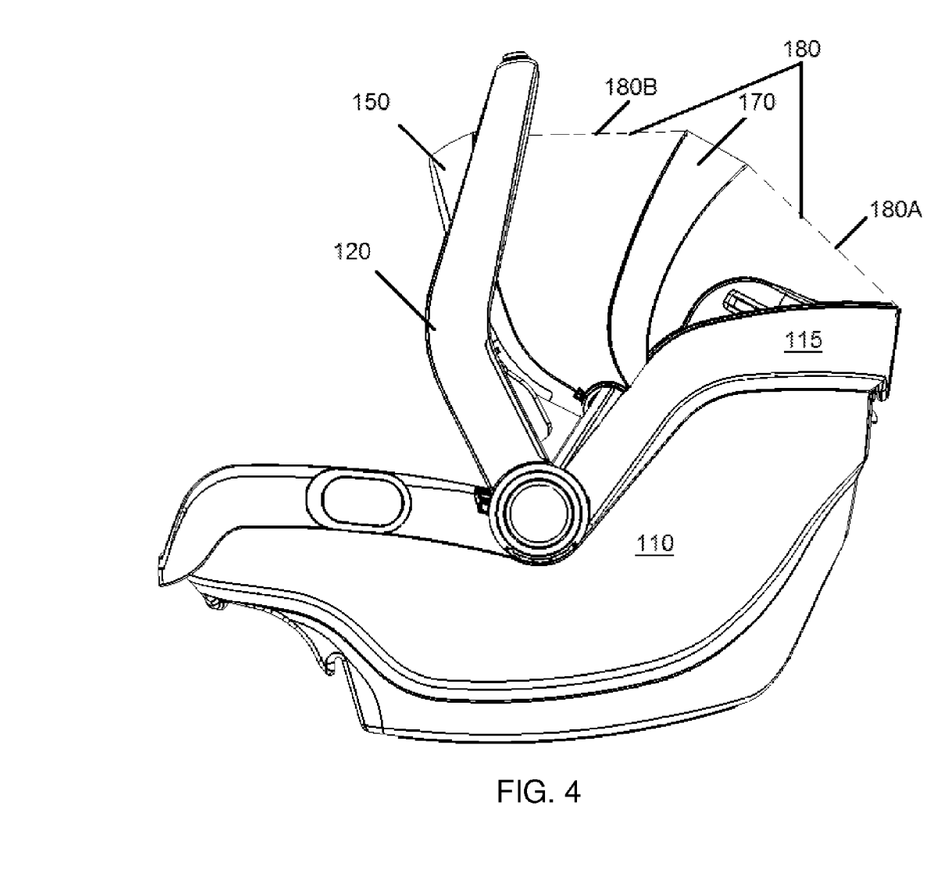
FIG. 4 is a plan view from the side of a child conveyance device in accordance with an embodiment of the present invention.

To open the canopy, a user pulls or otherwise moves the canopy cap 150 away from the upper portion of the shell 110. In some embodiments, the canopy cap 150 may be releasably secured closed against the upper portion of the shell 110 by a latch, snap, hook, or other securing mechanism in or on the canopy cap and/or by a complimentary securing mechanism located in or on the shell 110. In some embodiments, the user may be required to operate a release mechanism, for example, a lock release button or lever to free the canopy cap 150 from the upper portion of the shell 110 prior to pulling it away from the shell. The canopy cap 150 may pivot about canopy cap pivot points 160 until it is in a fully extended position as illustrated in FIG. 4. The canopy cap 150 may also be pivoted into one or more positions intermediate between the closed position illustrated in FIG. 1 and the fully extended position illustrated in FIG. 4. In some embodiments the canopy cap 150 may be spring loaded or in some other way biased toward an open position. Upon activation of a release mechanism, the canopy cap 150 and canopy 180 may move into fully open or partially open position under the influence of a spring loaded mechanism or other biasing mechanism coupled to the canopy cap.

As the canopy cap 150 is pivoted forward, a canopy, indicated in outline by dotted lines 180 in FIG. 4, is pulled out from one or both of the first recess 115 in the shell 110 and from the second recess 190 in the canopy cap 150. As the canopy cap 150 is pivoted forward, a second canopy support mechanism, for example, a stanchion 170 may also be pulled from a closed position. In the closed position, the stanchion 170 may be positioned partially or fully within the first recess 115 in the shell 110 and/or partially or fully within the second recess 190 within the canopy cap 150. The stanchion 170 may pivot forward about stanchion pivots (not shown) formed in the sides of the shell 110 into a fully open position as illustrated in FIG. 4 or into a position intermediate between the fully open position illustrated in FIG. 4 and a fully closed position. The fully closed position for the stanchion 170 may be a position in which the stanchion is at least partially positioned within the first recess 115 and/or the second recess 190. In some embodiments, the stanchion 170 may be spring loaded or otherwise biased toward an open position, and may open along with the canopy cap 150 into a fully or partially open position upon activation of a release mechanism.

The stanchion 170 may include a portion located in, for example, a pocket of the canopy, in one or more loops of fabric, cable, or string secured to the fabric of the canopy 180, between layers of material of which the canopy 180 is formed, or coupled to the canopy 180 by one or more snaps, buttons, or other fasteners. This portion of the stanchion 170 may mechanically couple the stanchion 170 to the canopy. The stanchion may additionally or alternatively be coupled to the canopy cap 150 by one or more cables, strings, or other connecting mechanisms. Opening of the canopy cap 150 may exert a force on the fabric of the canopy 180 which is transferred to the stanchion 170 to pull the stanchion 170 into an open position. In some embodiments, the stanchion 170 may be mechanically coupled to the canopy cap 150 but not to the canopy 180. The stanchion 170 may freely slide across a surface of the canopy 180. One or more additional canopy support members (not shown) may also be provided to support the canopy 180 above a child seat in the child conveyance device 100. The stanchion 170 and/or the one or more optional canopy support members may be substantially U-shaped or C-shaped to provide the canopy with a curved upper surface when extended into an open position, although the shapes of the stanchion 170 and/or the one or more optional canopy support members may be any of various shapes, for example, semi-circular or squared in various embodiments. The stanchion 170 may perform multiple functions. The stanchion 170 may support the canopy in a position elevated above a child seat in the child conveyance device 100. The stanchion 170 may also push or otherwise direct a portion or the entirety of the rear section 180A of the canopy 180 into the first recess 115 and/or a portion or the entirety of the forward section 180B of the canopy 180 into the second recess 190 when the canopy is moved into a retracted or closed position, for example by pivoting the canopy cap 150 back to a closed position against the shell 110 as is illustrated in FIG. 1. The stanchion 170 may retain a portion or the entirety of the canopy 180 within the first recess 115 and/or second recess 190 while the canopy is in the retraced or closed position. A first portion of the stanchion 170 may reside within the first recess 115 and a second portion of the stanchion 170 may reside in the second recess 190 when the canopy cap is closed and the canopy is in the retracted or closed position or configuration.

In some embodiments, the canopy cap 150 may be opened into a partially open position. The stanchion 170 may remain in a closed position at least partially within the first recess 115 and/or the second recess 190 until the canopy cap 150 and/or canopy 180 are opened beyond a predetermined point. This predetermined point may be, for example, a point at which the canopy cap 150 and/or canopy 180 are pivoted into a position about half way between fully closed and fully open.

Figure 5:
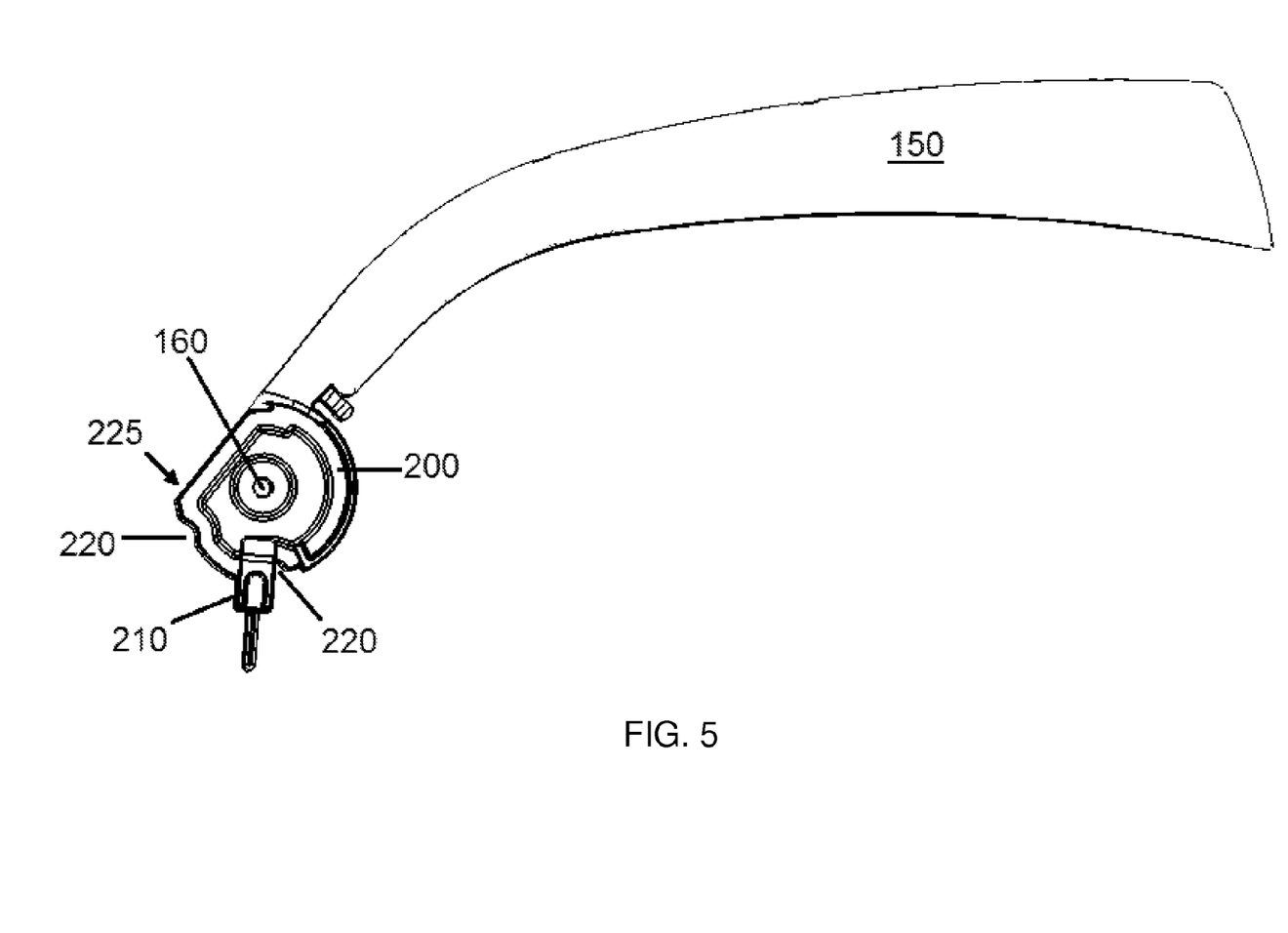
FIG. 5 is a plan view from the side of a portion of a canopy cap for a child conveyance device in accordance with an embodiment of the present invention.

The canopy cap 150 may be coupled to a cam 200 to provide for the canopy cap to pivot about the pivot point 160. The cam 200 is illustrated in FIG. 5 where the shell 110 and other components of the child conveyance device have been omitted to better illustrate the canopy cap and cam mechanism. The cam 200 may be pivotally secured to the shell 110 at an inner or outer portion thereof and configured to rotate about pivot point 160. The cam 200 may include one or more recesses 220 which cooperate with a cam follower 210 to releasable secure the canopy cap 150 in one or more positions. The cam follower 210 may be mounted to a portion of the shell 110, for example, an internal surface of the shell 110 and may be pushed or biased against a surface of the cam 200 by, for example, a spring or other mechanism. The cam follower 210 may engage the one or more recesses 220 upon rotation of the canopy cap 150 about the pivot point 160. The recesses 220 may have curved side walls such that the cam follower 210 secures the canopy cap in position by engagement with the recesses, but may be forced out of a recess 220 by the application of sufficient force to compress the spring or other mechanism biasing the cam follower 210 into a particular recess 220 and pivot the canopy cap out of the position in which the cam follower 210 engages the particular recess 220. When the canopy cap 150 is in a fully open or extended position, the cam follower may releasably secure the canopy cap 150 in this position by engaging a surface 225 on the cam 200. When the canopy cap 150 is in a fully closed position, the cam follower may releasably secure the canopy cap 150 in this position by engaging a first recess 220 on the cam 200 as illustrated in FIG. 5. When the canopy cap 150 is in a partially open position, the cam follower may releasably secure the canopy cap 150 in this position by engaging the second recess 220 on the cam 200 illustrated in FIG. 5. Application of sufficient force to the canopy cap 150 may disengage the cam follower 210 from the surface 225 in a similar manner as from a recess 220.

It is to be understood that the pivot mechanism for the canopy cap 150 illustrated in FIG. 5 is exemplary only. Other mechanisms for providing for the canopy cap to pivot and to be releasably secured in one or more positions may be included in various embodiments of the child conveyance device. In some embodiments the pivot mechanism for the canopy cap 150 may be configured to lock the canopy cap 150 in one or more positions, for example in a fully closed or retracted position, in a fully open or extended position, or in a partially open position. A user may be required to actuate a lock release button or lever to release the lock and move the canopy cap 150 out of the locked position.

In some embodiments, the stanchion 170 may be provided with a similar pivot mechanism as the canopy cap 150 to releasably retain the stanchion in one or more positions, for example, a fully closed or retracted position, a fully open or extended position, or a partially open position.

The materials of construction of the various parts of the child conveyance device are not critical and different parts may be formed of the same or of different materials. Items such as the shell 110, carrying handle, 120, canopy cap 150, and other portions of the child conveyance device may be formed of materials known in the art for the construction of child conveyance devices, such as plastic. The stanchion 170 and/or the one or more optional canopy support members may be formed of plastic, metal, or one or more other semi-rigid materials. The canopy 180 may be formed from, for example, cotton, polyester, wool, or any other natural, synthetic, or blended fabric known in the art for use in forming canopies. One or more portions of the canopy 180 may be opaque, transparent, or semi-transparent. One or more portions of the canopy 180 may be waterproof. The canopy 180 may be formed of a contiguous material or may include one or more apertures.

Figure 6:
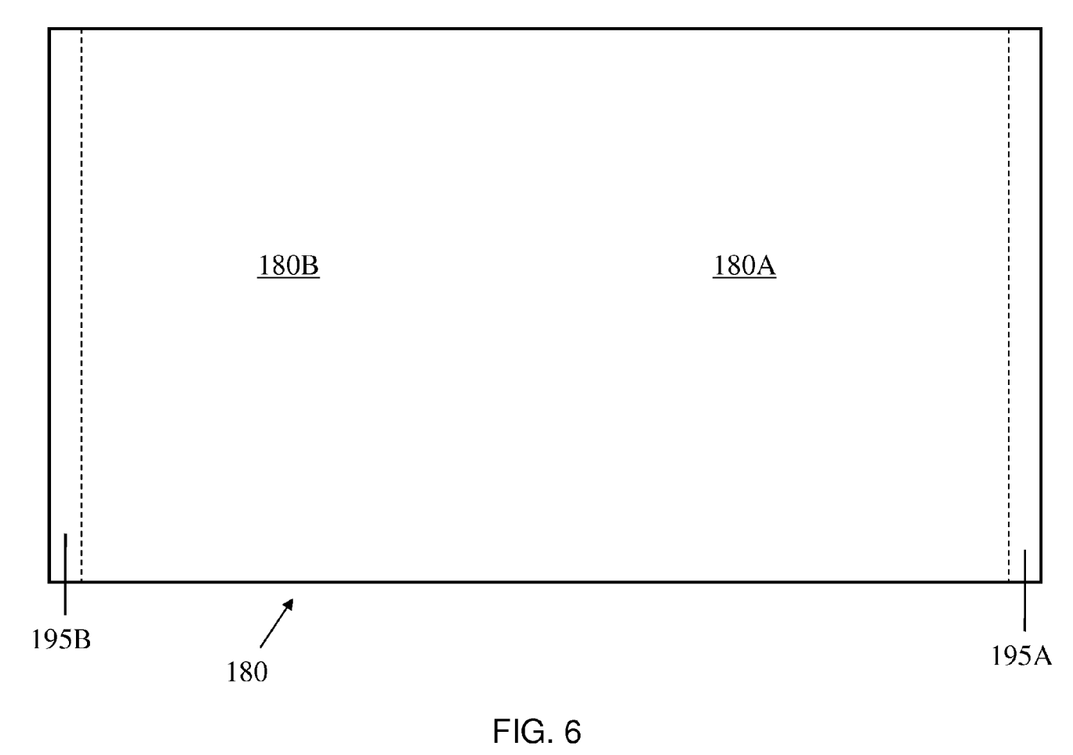
FIG. 6 is plan view of a canopy in accordance with an embodiment of the present invention.

In some embodiments, the canopy 180 may be removable from the child conveyance device. This may facilitate washing of the canopy 180. In some embodiments, for example, as illustrated in FIG. 6, the canopy 180 may have end portions which are folded over onto one another and secured, for example, by sewing, snaps, buttons, hook and loop fasteners, or other fasteners to form tubular sections of fabric 195A, 195B. A section of plastic piping 300 (illustrated in cross section in FIG. 8), for example, polypropylene piping may be inserted into the tubular sections of fabric 195A, 195B. Although referred to as "plastic piping" herein this piping may be formed of any semi-rigid material desired and may be shaped as a tubular pipe, as a solid rod, or any other shape desired. The plastic piping within the tubular sections of fabric 195A, 195B may cooperate with snaps, tabs, holddowns, or stepped edges in one or both of the canopy cap 150 and the shell 110 to releasably secure the canopy to the canopy cap and/or shell.

As illustrated in FIG. 7, the canopy cap 150 may have one or more tabs 230 and/or one or more tube end capture blocks 235 included in the second recess 190. The one or more tabs 230 and/or tube end capture blocks 235 may be fabricated from a resilient material, for example, one or more types of plastic, which may deform to allow the plastic piping inserted into the tubular section of fabric 195B to be pressed into place in or under the one or more tabs 230 and/or tube end capture blocks 235. Ends of the plastic piping may be secured within the end capture blocks 235. Portions of the plastic piping within the tubular sections of fabric 195B may be pressed into place in or under the one or more tabs 230 and/or tube end capture blocks 235 to hold the front section of the canopy 180B in place attached to the canopy cap 150. Similar tabs 230 and/or tube end capture blocks 235 may be present in or proximate the first recess 115 in the shell 110 to provide for the rear section of the canopy 180A to be secured to the shell 110 by retaining a section of plastic piping inserted into the tubular section of fabric 195A.

The canopy 180 may be removed from the canopy cap 150 and/or shell 110 by, for example, applying sufficient force to dislodge the plastic piping from in or under the one or more tabs 230 and/or tube end capture blocks 235 in the shell 110 and/or canopy cap 150. In other embodiments, an end of the plastic piping may be removed from an end capture block 235, when present, and pulled out from the tubular section of fabric 195A and/or 195B. Once the plastic piping is removed from the tubular section of fabric 195A and/or 195B the canopy may be removed from the canopy cap 150 and/or shell 110 because the plastic piping is no longer present to hold the canopy in place. The stanchion 170 may also then be removed from the pocket or other securing mechanism in or on the canopy, when present, holding the stanchion in place in the canopy. The canopy may then be washed, for example, in a conventional clothing washing machine and then replaced on the child conveyance device 100.

Figure 8:
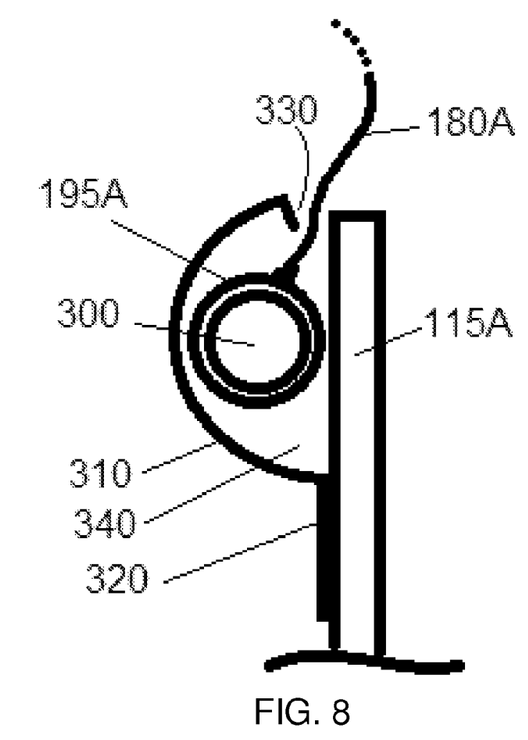
FIG. 8 is a cross sectional view of a portion of a rear wall of a shell of a child conveyance device in accordance with an embodiment of the present invention.

In some embodiments a hold-down for the canopy in the canopy cap 150 and/or shell 110 may be formed from a continuous piece of material rather than as discreet tabs. For example, as illustrated in FIG. 8 which is a cross sectional view of an upper portion of a rear wall 115A of the first recess 115, a hold-down 310 may be secured to an inner portion of the rear wall 115A of the first recess 115 at a lower portion 320 thereof. The hold-down 310 may be secured to the rear wall 115A with fasteners, for example screws or nuts and bolts or with an adhesive, for example, epoxy. The hold down 310 may extend substantially continuously about the inner portion of the rear wall 115A. The hold-down 310 may be formed of a resilient material, for example plastic, which may deform upon application of a sufficient force. A tubular section of fabric 195A of the canopy 180 including a section of plastic piping 300 disposed within may be inserted into and retained in a cavity 340 defined by the hold-down 310 and rear wall 115A. The tubular section of fabric 195A may be pushed through the gap between the upper end of the hold-down 310 and the rear wall 115A with sufficient force to deform the hold-down 310 and allow the tubular section of fabric 195A to enter the cavity 340. A tab or ledge section 330 of the hold-down 310 may facilitate retaining the tubular section of fabric 195A within the cavity 340, thus securing the canopy 180 to the shell 110. The upper end of the hold-down 310 may extend slightly above the upper end of the rear wall 115A. To release the canopy 180 from the shell 110, a user may push the upper end of the hold-down 310 away from the rear wall 115A until there is sufficient clearance between the hold-down 310 and the rear wall 115 for the tubular section of fabric 195A including the section of plastic piping 300 to pass through.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A child conveyance device comprising:
   a shell including a first canopy recess;
   a canopy support mechanism including a canopy cap having a second recess, the canopy support mechanism pivotally coupled to the shell; and
   a retractable canopy mounted on the canopy support mechanism;
   wherein the canopy support mechanism is configured to support a portion of the canopy, and to secure a portion of a rear section of the canopy within the first canopy recess and a portion of a forward section of the canopy within the second recess when the canopy is in a closed position; and
   wherein the canopy is entirely enclosed within the first canopy recess and the second recess when the canopy is in the closed position.

2. The child conveyance device of claim 1, wherein the canopy support mechanism is coupled to the shell by a cam, the cam configured to releasably retain the canopy cap in each of a position in which the canopy is in a fully extended position and in which the canopy is in the closed position.

3. The child conveyance device of claim 2, wherein the cam is further configured to releasably retain the canopy support mechanism in a position in which the canopy is in a partially extended position.

4. The child conveyance device of claim 1, wherein the child conveyance device comprises a stroller.

5. The child conveyance device of claim 1, wherein the child conveyance device comprises a car seat.

6. The child conveyance device of claim 1, wherein the canopy support mechanism further comprises a semi-rigid stanchion configured to support a portion of the canopy.

7. The child conveyance device of claim 6, wherein the stanchion is configured to secure the portion of the rear section of the canopy within the first recess when the canopy cap is in the closed position.

8. A child conveyance device comprising:
   a shell including a first canopy recess;
   a canopy support mechanism including a stanchion and a canopy cap, the canopy cap having a second recess, the canopy support mechanism pivotally coupled to the shell; and
   a retractable canopy mounted on the canopy support mechanism;
   wherein the stanchion is configured to support a portion of the canopy, and to secure a portion of a rear section of the canopy within the first canopy recess and a portion of a forward section of the canopy within the second recess when the canopy is in a closed position.

9. The child conveyance device of claim 8, wherein the stanchion is pivotally secured to the shell.

10. The child conveyance device of claim 8, wherein the stanchion is mechanically coupled to the canopy.

11. The child conveyance device of claim 8, wherein the stanchion is mechanically coupled to the canopy cap.

12. The child conveyance device of claim 8, wherein the canopy support mechanism is coupled to the shell by a cam, the cam configured to releasably retain the canopy cap in each of a position in which the canopy is in a fully extended position and in which the canopy is in a closed position.

13. The child conveyance device of claim 12, wherein the cam is further configured to releasably retain the canopy support mechanism in a position in which the canopy is in a partially extended position.

14. The child conveyance device of claim 8, wherein the child conveyance device comprises a stroller.

15. The child conveyance device of claim 8, wherein the child conveyance device comprises a car seat.

16. A child conveyance device comprising:
a shell including a first canopy recess;
a canopy support mechanism including a canopy cap having a second recess, the canopy support mechanism pivotally coupled to the shell; and
a retractable canopy mounted on the canopy support mechanism;
wherein the canopy support mechanism is configured to support a portion of the canopy, and to secure a portion of a rear section of the canopy within the first canopy recess and a portion of a forward section of the canopy within the second recess when the canopy is in a closed position; and
wherein the canopy is releasably affixed to one of the shell and the canopy cap by a section of plastic tubing disposed in a tubular section of fabric formed in the canopy, the tubular section of fabric including the section of plastic tubing releasably retained in a recess defined between a hold-down and a wall of one of the shell and the canopy cap, the hold-down formed of a resilient material and including an end portion configured to be displaced from a position adjacent the wall of the one of the shell and the canopy cap to a sufficient degree to allow the tubular section of fabric including the section of plastic tubing to be introduced or removed from the cavity.

17. A method of operating a canopy of a child conveyance device, the method comprising:
moving a canopy cap away from a closed position against a shell of the child conveyance device, the movement of the canopy cap drawing a portion of the canopy from one of a recess in the shell of the child conveyance device and a recess in the canopy cap, the movement of the canopy cap further drawing a stanchion from a position at least partially within one of the recess in the shell of the child conveyance device and the recess in the canopy cap; and
displacing the canopy cap from an open position to the closed position against the shell of the child conveyance device, the displacement of the canopy cap situating a portion of the canopy within one of the recess in the shell of the child conveyance device and the recess in the canopy cap.

18. The method of claim 17, further comprising actuating a lock release mechanism, releasing a lock holding the canopy cap in a closed position against the shell of the child conveyance device.

19. The method of claim 17, wherein a force applied from the stanchion to the canopy facilitates situating the portion of the canopy within one of the recess in the shell of the child conveyance device and the recess in the canopy cap.

20. The method of claim 17, further comprising:
situating a portion of a rear section of the canopy within the recess in the shell of the child conveyance device; and
situating a portion of a forward section of the canopy within the recess in the canopy cap.

* * * * *